United States Patent Office 2,742,465
Patented Apr. 17, 1956

2,742,465
AMINE SALT OF PENICILLIN

Roy S. Hanslick, Philadelphia, Pa., assignor to American Home Products Corporation, New York, N. Y., a corporation of Delaware No Drawing. Application March 29, 1955,
Serial No. 497,807

1 Claim. (Cl. 260—239.1)

This invention relates to a new amine salt of penicillin and more particularly to the compound (alpha-benzoyl-benzyl)-N-methylamine salt of penicillin.

The free base which forms the acid-addition salt with penicillin has the formula:

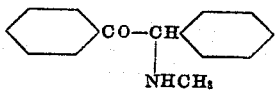

When the above base is combined with penicillin in a reaction between free base and penicillin acid or by a metathetical reaction between salts, the penicillin salt of the base is easily isolated.

The compound of the invention constitutes a valuable therapeutic agent since it has approximately the same solubility as procaine penicillin in water and may be substituted therefor. Alternatives to procaine penicillin are of medical value since persons allergic to procaine may thus be treated with other effective compounds without the procaine allergic effect.

The following example illustrates one method for preparing the compound.

EXAMPLE

Preparation of (alpha-benzoyl-benzyl)-N-methylamine-hydrochloride

Benzil (21.0 gms.) (0.1 M) is dissolved in 100 cc. of ethanol containing methylamine (3.4 gms.) (0.11 M). The clear solution is then subjected to catalytic hydrogenation in the presence of palladium and charcoal (2.0 gms. containing 5% palladium). Filter off spent catalyst and vacuum filter off the excess methylamine and most of the alcohol; then add ether to the residue. To the ether solution pass in dry hydrogen chloride gas to precipitate the amine-hydrochloride. M. P. 240–242° C.

Preparation of (alpha-benzoyl-benzyl)-N-methylamine-penicillin-G

Alpha-benzoyl-benzyl - N - methylamine - hydrochloride (2.6 gms.) (0.01 M) is dissolved in 75 cc. of water to which is added with stirring 25 cc. of water containing potassium penicillin-G (3.7 gms.), (0.01 M). The resulting precipitate is filtered and washed with water and dried, M. P. 147° C. (Nitrogen analysis: calculated 7.48%; found 7.6%. Sulfur analysis: calculated 5.70%; found 5.72%).

While the reaction as given in the example involves specific salts and water as the solvent medium, one may use other salts of the base and acid and of course other suitable media for carrying out the reaction, as would be obvious to one skilled in the art. Moreover, and as mentioned previously, one may react the free base and free penicillin acid in a suitable organic medium in which the reactants are soluble.

I claim:

The new compound, the penicillin G salt of (alpha-benzoyl-benzyl)-N-methylamine.

References Cited in the file of this patent
UNITED STATES PATENTS 2,550,398    Barol _____ Apr. 24, 1951